United States Patent [19]

Bazinet et al.

[11] Patent Number: 4,856,168
[45] Date of Patent: Aug. 15, 1989

[54] APPARATUS FOR POSITIONING THE END OF A FIRST ELONGATED SYNTHETIC PIECE WITH AT LEAST THE END OF A SECOND ELONGATED SYNTHETIC PIECE, FOR THE COUPLING THEREOF

[75] Inventors: Marc Bazinet, Emerainville; Jean Sauron, Draveil, both of France

[73] Assignees: Gaz de France; Societe Joseph Sauron Material Industriel, both of France

[21] Appl. No.: 172,694

[22] Filed: Mar. 23, 1988

[30] Foreign Application Priority Data

Mar. 30, 1987 [FR] France .................. 87 04414

[51] Int. Cl.⁴ .............................................. B23K 37/04
[52] U.S. Cl. ........................................ 29/272; 269/43; 269/131
[58] Field of Search ................. 29/272, 271, 237; 269/43, 45, 130-132, 287; 72/316, 318; 228/49.3, 44.5

[56] References Cited

U.S. PATENT DOCUMENTS

| 1,870,760 | 8/1932 | Tipton . | |
|---|---|---|---|
| 2,817,892 | 12/1957 | Jones . | |
| 3,414,950 | 12/1968 | Phariss . | |
| 3,661,378 | 5/1972 | Dodge et al. | 269/131 |
| 3,772,753 | 11/1973 | Sargeant . | |
| 3,827,126 | 8/1974 | Shiozawa et al. | 228/49.3 |
| 3,828,413 | 8/1974 | Province et al. . | |
| 3,920,232 | 11/1975 | Clark . | |
| 4,039,115 | 8/1977 | Randolph et al. | 228/49.3 |
| 4,415,304 | 11/1983 | Tripoli et al. | 29/272 |

FOREIGN PATENT DOCUMENTS

| 858160 | 12/1952 | Fed. Rep. of Germany . |
| 2586079 | 2/1987 | France . |
| 2587171 | 2/1987 | France . |
| 371768 | 10/1963 | Switzerland . |
| 556962 | 10/1943 | United Kingdom . |
| 797021 | 6/1958 | United Kingdom . |

Primary Examiner—Robert C. Watson
Attorney, Agent, or Firm—Steinberg & Raskin

[57] ABSTRACT

An apparatus for straightening and aligning the end of an elongated piece with the end of a second elongated piece, comprising a positioning device comprising a pusher means mounted in a radially movable manner with respect to an axis of one of the aforesaid ends in its straightened and aligned position and angularly movable about this axis, in a support structure, so as to be in a condition to exert a predetermined lateral radial pressure for the desired positioning of the said end.

15 Claims, 3 Drawing Sheets

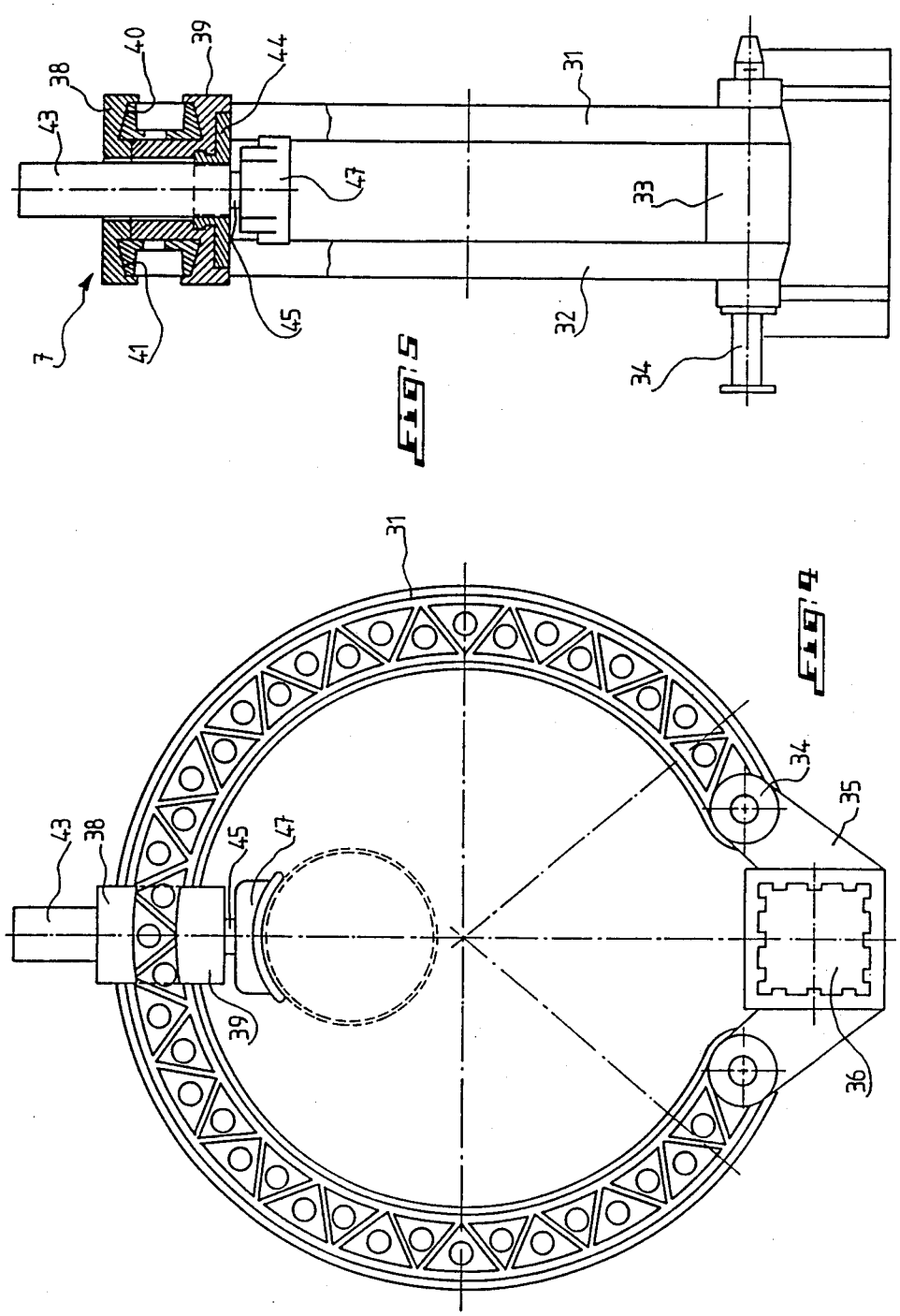

APPARATUS FOR POSITIONING THE END OF A FIRST ELONGATED SYNTHETIC PIECE WITH AT LEAST THE END OF A SECOND ELONGATED SYNTHETIC PIECE, FOR THE COUPLING THEREOF

The present invention has as an object an apparatus for straightening and aligning the end of a first elongated synthetic piece, such as a tube, with at least the end of a second elongated synthetic piece, such as a tube, for the coupling, in particular for the end-to-end coupling thereof.

Apparatus intended to this purpose are already known, which include at least a device for positioning one of the said tube ends with respect to the other, a device for holding the tube and a frame on which said positioning and holding devices are mounted. It is found in particular that these apparatus use straightening and aligning jaws the structure of which is compact and heavy, to which are associated control devices which are also heavy and bulky. Moreover, all these apparatus are designed for a single tube diameter.

Due to the important weight and to the bulkiness of the different devices and of the frame which carries them, the known apparatus, in particular for straightening and aligning tubes in an excavation, are difficult to mount and to handle in the latter.

The objective of the present invention is to propose an apparatus which overcomes the aforesaid drawbacks.

To meet this objective, an apparatus according to the invention is characterized with respect to the above-described apparatus of known type in that the positioning device comprises a pusher means mounted radially movable with respect to the axis of the end, in its straightened and aligned position, to which it is associated, and angularly movable about this axis, in a support structure, so as to be in a condition to exert a predetermined lateral radial pressure for the desired positioning thereof.

According to an advantageous feature of the invention, the support structure of the pusher means comprises a bow and the pusher means is advantageously formed of the piston of a jack such as a hydraulic jack mounted in a slide-shaped support movable on said bow.

According to another advantageous feature, a device for holding the apparatus according to the invention comprises a support part mounted in a fixed manner on the frame and a carriage movable perpendicularly to the axis of the elongated piece which it holds, on the support, the carriage advantageously comprising means forming a cradle for receiving said piece and a means for tightly holding the latter in the cradle, such as a clamping strap anchored on both sides of the cradle so as to surround the free circumferential part of the piece, radially opposite the said cradle means.

The invention will be better understood and further objects, features, details and advantages thereof will appear more clearly as the following explanatory description proceeds with reference to the accompanying diagrammatic drawings given by way of example only illustrating an embodiment of the invention and wherein:

FIG. 4 is an axial side view of a bow with a movable support slide for positioning the end of a tube, forming part of the apparatus according to the invention shown in FIG. 1, and FIG. 5 is a side view with partial cross-section of the bow according to FIG. 4.

Figure 1:
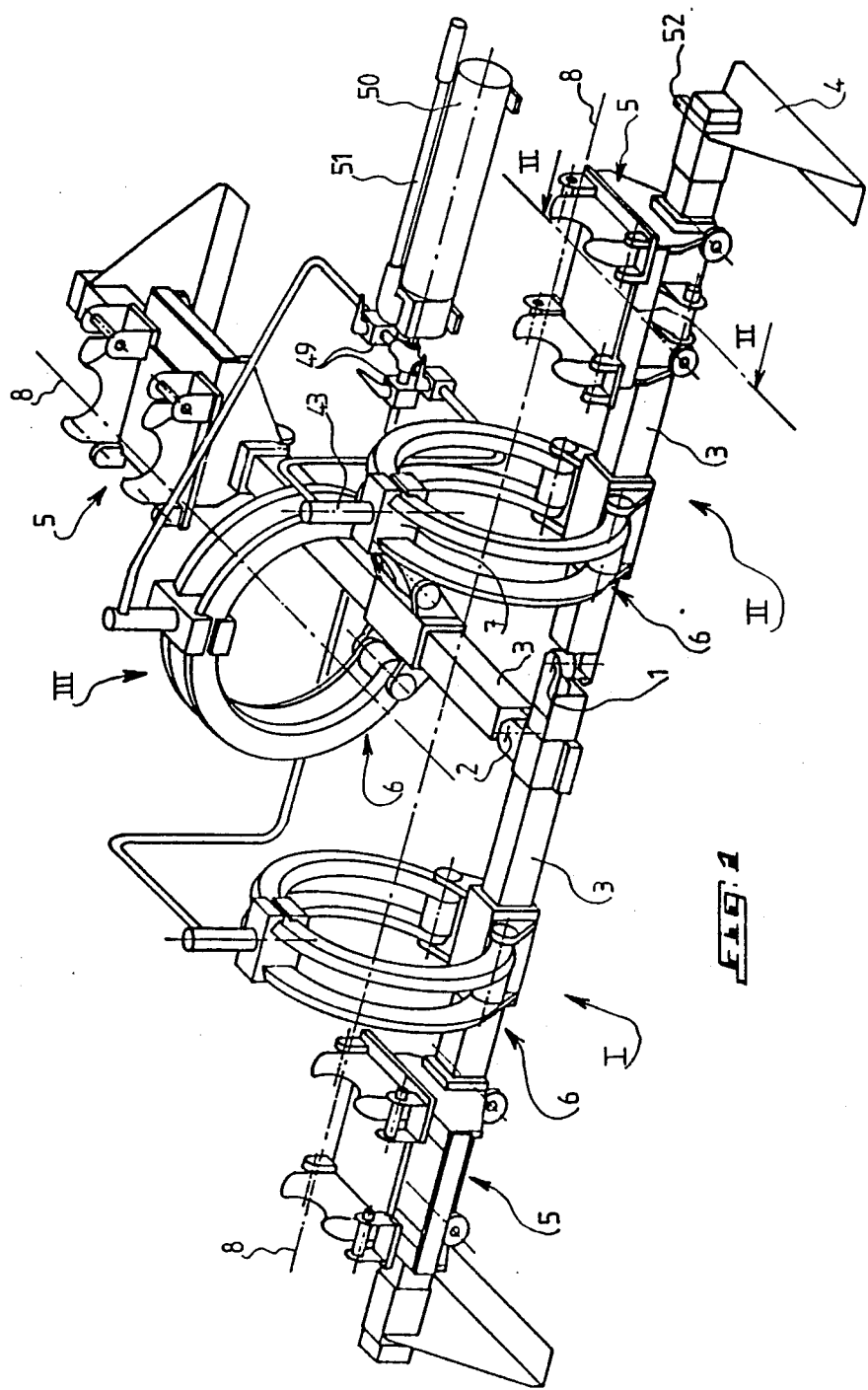
FIG. 1 is a perspective view of an apparatus according to the present invention.

The apparatus according to the invention, which is shown by way of example in FIG. 1, is designed to permit the positioning of the ends of three synthetic tubes stored for example in a wound up condition on drums for and in the course of the connecting operations thereof. To this end, the apparatus comprises three parts I, II and III each of which being designed to carry out the gripping, the clamping and the aligning of a tube end and to hold same during the heating and cooling cycle of the connection accessories such as sleeves, which are known per se and are therefore not shown. To permit the assembling or connection according to configurations with the desired angular shift, the three parts I, II and III are hinged at 1 and 2.

Each part I, II or III comprises a frame comprising essentially a girder 3 made of a steel tube with a square cross-section, which rests at its free end on a support 4, a jaw-carriage 5 for clamping and translating a tube and a bow 6 with a movable support slide 7 for correctly positioning the end of the tube for the aligning thereof with respect to the ends of the other tubes, to which this end is to be connected. The dotted lines 8 symbolize the axes of the tubes in the aligned position of the ends thereof. For that purpose, the support side 7 is angularly movable in a plane perpendicular to the axis 8, about same, on the periphery of bow 6.

Figure 2:
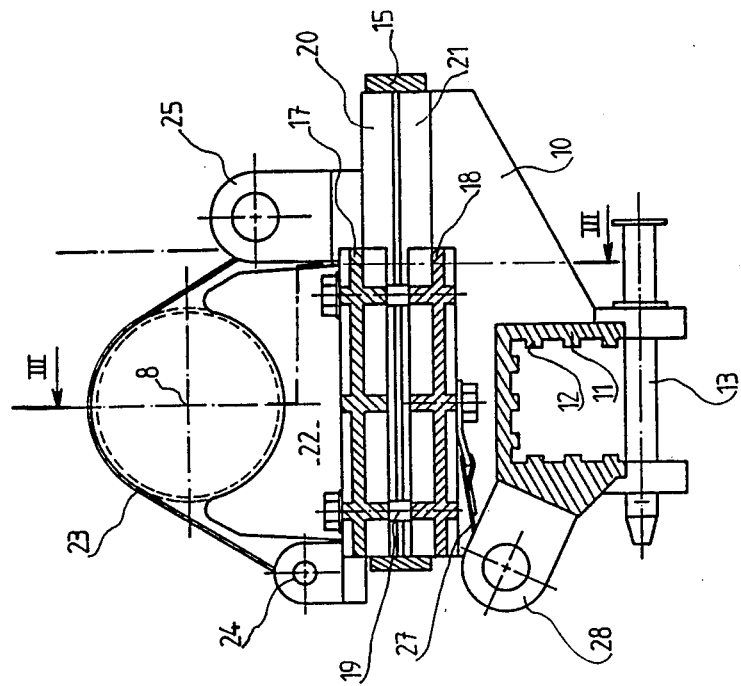
FIG. 2 is a cross-sectional view along line II—II of FIG. 1.
Figure 3:
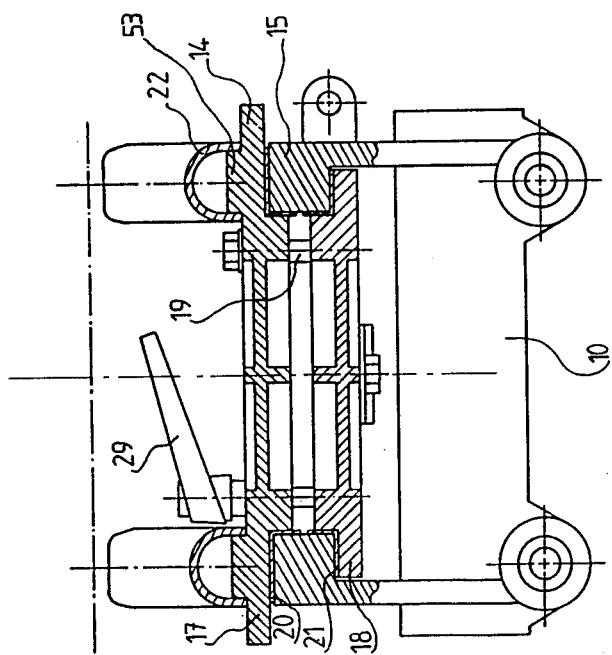
FIG. 3 is a broken cross-sectional along line III—III of FIG. 2.

Referring to FIGS. 2 and 3, it is seen that a jaw-carriage 5 according to the invention comprises a stationary support part 10 provided with a base 11 for gripping on the frame girder 3. This base 11 presents a cross-section which is complementary to that of the girder and carries advantageously on its surfaces intended to come into contact with the girder projecting elements 12. The supporting part 10 is provided with two positioning pin devices 13 permitting the immobilization of the jaw-carriage 5 on girder 3.

A carriage-forming part 14 itself is slidably mounted in translation in a direction perpendicular to the plane defined by the axis of girder 3 and the axis of the aligned tube 8, on L-shaped slides 15 provided at each end of the fixed support part 10. The carriage part 14 comprises an upper plate 17 and a lower counter-plate 18, which are removably fit together with the aid of screws 19, so that the free legs of the L-shaped slides enter between both plates.

The support part 10 and the carriage part 14 are made of a light material, such as a cast light alloy, for example cast aluminum. Moreover, as clearly seen in FIGS. 2 and 3, these parts, in particular the carriage part 14, are made in such a manner that appropriate recesses and ribs are provided to obtain a light and strong apparatus. Structural elements 20, 21 with a L-shaped cross-section, made for example of stainless steel, are inserted respectively between upper plate 17 and slide 15 on the one hand, and between counter-plate 18 and slide 15 on the other hand, to ensure a good sliding motion of the plates on the slide.

The upper plate 17 carries on its upper surface, near each end, an element 22 with a recess in the shape of an arc of a circle, in the plane perpendicular to the tube axis 8 and which is open upwards. The two elements 22 thus form a cradle which permits a tube to be supported, as schematically illustrated in FIG. 2. To each cradle element 22 is associated a clamping strap 23 made advantageously of polyester which is anchored on both parts of element 22, on carriage plate 14, respectively at 24 and 25, the anchoring point 25 being provided with winding means enabling the strap 23 to always bring the tube back into its appropriate position in the cradle. The surfaces of the elements of cradle 22, for contact with the tube, present a chamfered shape which is designed not to hurt the tube, as it is clamped by straps 23. The carriage part 14 may be displaced in translation on the slides 15 of the stationary support part 10 with the aid of an actuating means with a unidirectional effect, essentially comprising a strap 27 and winding means shown at 28 which are mounted on the base-forming part 12, the free end of strap 27 being attached to the lower surface of the counter-plate 18 of carriage 14. The jaw-carriage 5 of parts I and II of the apparatus according to the invention, which are shown in FIG. 1, advantageously position themselves in a head to tail manner on frame 3.

It is still to be noted that the carriage 14 of a jaw-carriage 5 according to the invention is equipped with a means for locking the carriage on the slides 15 of the stationary support part 10, by means of advantageously hand-actuated means, such as a lever diagrammatically shown at 29 in FIG. 3.

Referring to FIGS. 4 and 5, it is seen that a straightening bow 6 according to the invention is made of two annular elements 31, 32 parallel to each other and disposed at a certain axial distance perpendicularly to tube axis 8. Both elements 31, 32 are assembled in the lower part with distance blocks 33 and may be removably fixed with pins 34 on a base-forming part 35 slidably mounted on the frame girder 3. It is seen that the base 35 presents a passageway with a rectangular cross-section complementary to that of the girder.

As shown in FIG. 5, the movable support slide 7 is composed of one radially outer element 38 and one radially inner element 39, which are shaped in such a manner that once assembled by any appropriate means, they form on both sides of their mid-plane parallel to the planes of annular elements 31, 32 recesses 40, 41 each having a shape complementary to the cross-section of elements 31, 32 so that the support slide 7 can move angularly about axis 8, in the circumferential direction of bow 6, while being perfectly kept in position and guided. The recesses 40 and 41 become broader from the axially outer face of elements 38, 39 towards the interior and the annular elements 31, 32 present on their radially outer and inner surfaces complementary shaped chamfers with respect to the recesses, so that the strains exerted on the bow concentrate on the movable support slide 7, whereby the assembly is stiffened.

The movable support slide 7 carries a hydraulic jack 43 or a jack of any other appropriate nature, through a fixing part 44. The jack extends radially through the movable support slide 7, between annular elements 31, 32. The piston rod of the jack is shown at 45, which extends radially towards the tube axis 8 and carries at its free end a pusher head 47 which is adapted to come into contact with the side surface of the end of the tube to be positioned, as seen in Figure 4 in which is schematically shown in dotted line a tube end to be positioned along axis 8. The surface of the pusher head 47 intended to come into contact with the tube presents an appropriate curve. As shown in Figure 1, the jacks of the different bows with movable support slide are each connected through a valve element 49 to a pressurized fluid control device 50, which is advantageously hand-actuatable, e.g. by means of a lever 51. The operation of this lever provokes the motion in radial direction of the pusher head 47 of the movable support slide 7.

To complete the description of the apparatus according to the invention, it is further to be indicated that the supports 4 of the frame girders 3 present recesses 52 for housing the girder 3, which recesses are laterally open thus permitting the withdrawal of support 4 from the girder by means of a simple side movement without being obliged to act upon girder 3.

It should be further added that the frame may be provided in its part close to the connecting area of the tubes with a marking which facilitates the cutting of the tube.

Concerning the operation of the apparatus which has just been described and the way of actuating same the short following remarks seem sufficient. It is supposed that two tubes are to be connected end to end inside an excavation. The apparatus according to the invention, owing to the modular base structure, can be readily mounted on the bottom of the excavation. One only has to use the parts I and II shown in FIG. 1. Each of the tubes to be connected is fixed on the jaw-carriage 5 of one part, by means of cradle elements 22 and of the clamping strap 23. The cradle elements 22 are removable and can be readily force-fixed e.g. on the protuberance 53 of the upper plate 17 of carriage 14. By means of an appropriate displacement, facilitated by the possibility to move the carriages 14 in a head to tail manner, the ends of the tubes can be brought into an appropriate position. After cutting of the tubes, and, possibly, installation of an appropriate connecting sleeve, the positioning of the tube ends is started. To this end, the movable support slide 7 of bow 6 surrounding the end to be positioned is put into the appropriate angular position. Thereafter, a pressurized fluid is sent into jack 43, by actuating the lever 51 of the source 50 of pressurized fluid to enable the jack pusher head 47 to exert a side pressure on the tube end, and to push the latter into its desired position e.g. along axis 8. These operations are carried out for each of the tubes which are then correctly positioned and maintained in that position for the operation of connection. It is obvious that, owing to the hinge 1 between parts I and II, the apparatus according to the invention permits a shift between the two tubes according to a desired angle. In order to carry out the assembling of three tubes, the part III is added to parts I and II. It is then sufficient to position the third tube in an appropriate manner with respect to the first and second tubes, in the way which has just been described.

The apparatus according to the invention presents a number of advantages. The use of cast light alloys for making the different modules of the apparatus, the design of the shapes, thicknesses and ribs make it possible to obtain a light and strong apparatus which is not subject to deterioration. The use of clamping straps 23 made of polyester, for the clamping and for the operations of translation renders it possible to reduce the number of moving mechanical parts. The modular design of the apparatus and the low weight thereof facilitate its mounting and its dismounting in an excavation.

Its withdrawal is carried out without the need to move the tube. The jaw-carriages 5 position themselves in a head to tail manner on girder 3. Once this girder on the bottom of the excavation, a symmetrical translation with respect to the axis of the tube to be assembled is possible which permits a greater clearance and a smaller bulkiness than with the known apparatus. The fixing of the jaw-carriage does not impede the translation thereof along the axis of the tube before or after the cutting. This makes it possible to bring the tubes back into an end-to-end position with a minimum effort. Once the appropriate position is thus found, the locking on the girder is readily carried out by means of pins 13. As each jaw-carriage possesses two support points formed of cradle elements 22, the tube is readily positioned. The straightening bow with a movable support slide makes it possible to carry out the straightening operation with a latitude of about 300° about the bow. Finally, the set of tools for handling the apparatus is reduced : a single wrench might be sufficient. The apparatus according to the invention permits the positioning of tubes with very different diameters, e.g. of 160, 125, 110 and 90 mm by changing the cradle elements 22 only.

What is claimed is :

1. An apparatus for straightening and aligning the end of a first tubular member made of a synthetic material with at least the end of a second tubular member of synthetic material, for the coupling thereof, said apparatus comprising a frame on which are mounted devices for holding said tubular member ends located at a predetermined distance from each other in the axial direction of the tubular members and at least a device for positioning one tubular member end, adapted to move said end perpendicularly with respect to its axis into a position axially aligned with the other end and located between the holding devices, the positioning device comprising a support structure having the shape of a bow supported on said frame, coaxially therewith and through which extends said tubular member, and a pusher means mounted on said bow movably thereon in the peripheral direction about the axis of said bow between different angular positions and radially movable between a withdrawn position and a position in contact with the lateral peripheral surface of the tubular member, so as to be in a condition to exert a predetermined lateral pressure for laterally moving said tubular member in its position axially aligned with said other tubular member.

2. An apparatus according to claim 1, wherein the pusher means comprises a pusher head mounted on the piston rod of a jack mounted in a movable support slide.

3. An apparatus according to claim 1, wherein a holding device comprises a support part mounted in a fixed manner on a support and a carriage mounted in a perpendicularly movable manner on the support part, the carriage comprising cradle-forming means for housing said tabular member and means for fixedly holding the latter in the cradle.

4. An apparatus according to claim 3, wherein the holding means is formed of a clamping strap, made of a synthetic material anchored on both sides of the cradle so as to surround the free circumferential part of the tubular member, radially opposite the cradle.

5. An apparatus according to claim 1, wherein the frame is essentially formed of a girder, on which the holding and positioning devices are lockable by fastening means, the frame girder being supported on supports.

6. An apparatus according to claim 5, wherein said girder has a square cross-section.

7. An apparatus according to claim 5, wherein each support of the frame girder comprises a recess for housing the girder, which is laterally open so as to permit the withdrawal of the support from the girder by means of a simple side movement of the support with respect to the girder.

8. An apparatus according to claim 2, wherein said bow comprises two annular elements which are assembled so as to extend in a parallel manner with respect to each other while forming between them an annular space permitting the movement of the pusher means about said axis, both annular elements being removably mounted on a part forming a support for fastening on the frame, by means such as fastening pins.

9. An apparatus according to claim 8, wherein the pusher means is movable about the aforesaid axis within an angle of about 300°.

10. An apparatus according to claim 3, wherein the jaw-carriage of a holding device is movable perpendicularly with respect to the frame girder, by means of an actuating means such as a strap.

11. An apparatus according to claim 3 in particular for the connection of two tubular members, wherein the carriages of holding devices associated to both tubular members are movable in a head to tail manner on the frame.

12. An apparatus according to claim 1, wherein the holding and positioning devices are made of light alloys which present a perforated structure with hollow portion which is stiffened by appropriate reinforcing ribs.

13. An apparatus according to claim 5, wherein the frame-forming girder comprises two girder sections hinged to each other so as to permit the connection of two elongated pieces in a curved configuration.

14. An apparatus according to claim 1, wherein the frame is formed of a configuration of three hinged girder sections to permit the connection of three elongated pieces.

15. An apparatus according to claim 3, wherein the cradle elements are removably mounted on the holding device.

* * * * *